(12) United States Patent
Dusoulier

(10) Patent No.: US 9,409,817 B2
(45) Date of Patent: Aug. 9, 2016

(54) COATED GLASS SHEET

(75) Inventor: Laurent Dusoulier, Jumet (BE)

(73) Assignee: AGC GLASS EUROPE, Bruxelles (BE)

( * ) Notice: Subject to any disclaimer, the term of this patent is extended or adjusted under 35 U.S.C. 154(b) by 731 days.

(21) Appl. No.: 13/501,837

(22) PCT Filed: Oct. 15, 2010

(86) PCT No.: PCT/EP2010/065517
§ 371 (c)(1),
(2), (4) Date: Apr. 13, 2012

(87) PCT Pub. No.: WO2011/045413
PCT Pub. Date: Apr. 21, 2011

(65) Prior Publication Data
US 2012/0202073 A1     Aug. 9, 2012

(30) Foreign Application Priority Data

Oct. 16, 2009  (EP) .................................... 09173306

(51) Int. Cl.
*B32B 7/02*      (2006.01)
*C03C 17/34*     (2006.01)
*C03C 17/245*    (2006.01)
*C03C 17/36*     (2006.01)

(52) U.S. Cl.
CPC ......... *C03C 17/3411* (2013.01); *C03C 17/2453* (2013.01); *C03C 17/3417* (2013.01); *C03C 17/3423* (2013.01); *C03C 17/3435* (2013.01); *C03C 17/366* (2013.01); *C03C 17/3686* (2013.01); *C03C 2218/152* (2013.01); *C03C 2218/154* (2013.01); *C03C 2218/365* (2013.01)

(58) Field of Classification Search
CPC ............ C03C 17/2453; C03C 17/3411; C03C 2218/365
USPC .................................. 428/220, 426, 428, 432
See application file for complete search history.

(56) References Cited

U.S. PATENT DOCUMENTS

| 4,610,771 | A | 9/1986 | Gillery |
| 4,687,687 | A | 8/1987 | Terneu et al. |
| 5,073,451 | A | 12/1991 | Iida et al. |
| 5,411,794 | A | 5/1995 | Kawaguchi et al. |
| 2003/0039843 | A1 | 2/2003 | Johnson et al. |
| 2006/0263610 | A1 | 11/2006 | Greenberg et al. |
| 2007/0218264 | A1* | 9/2007 | Gueneau et al. ............. 428/220 |
| 2007/0243993 | A1 | 10/2007 | Heithoff et al. |
| 2009/0183987 | A1 | 7/2009 | Weigert et al. |
| 2010/0233473 | A1 | 9/2010 | Greenberg et al. |

FOREIGN PATENT DOCUMENTS

| DE | 10 2006 027 029 | 12/2007 |
| EP | 0 530 676 | 3/1993 |
| EP | 0637572 A1 | 8/1995 |
| EP | 1 293 726 | 3/2003 |
| FR | 2 579 588 | 10/1986 |
| GB | 2 302 102 | 1/1997 |
| WO | 2009 115596 | 9/2009 |

OTHER PUBLICATIONS

International Search Report Issued Nov. 30, 2010 in PCT/EP10/65517 Filed Oct. 15, 2010.

* cited by examiner

*Primary Examiner* — Bijan Ahvazi
*Assistant Examiner* — Lawrence Ferguson
(74) *Attorney, Agent, or Firm* — Oblon, McClelland, Maier & Neustadt, L.L.P.

(57) ABSTRACT

The invention relates to inorganic glass sheets coated on both sides thereof, the coating on a first side being formed by at least one hard layer and that on the other side by at least one silver-free durable reflecting layer, and to a process for manufacturing them by deposition of the hard layer via a CVD technique and that of the reflecting layer by magnetron vacuum sputtering. The sheets are used for the production of thermal insulating glazing and decorative glazing that reflects visible light.

21 Claims, No Drawings

COATED GLASS SHEET

The invention relates to the field of glass sheets coated with transparent layers on both faces and also to their process of manufacture and to their use.

The known systems of layers capable of being applied to a glass sheet are mainly of two types, namely, first, pyrolytic "hard" layers applied directly to the glass ribbon at high temperature during or after the floating of the glass on a bath of molten tin in the float process for the manufacture of flat glass and, secondly, stacks of "soft" layers applied by vacuum cathode sputtering.

European patent application EP 0 637 572 A discloses a glass sheet covered with a low emissivity layer on each of its faces, one of them being a pyrolytic hard layer and the other a stack of soft layers comprising a layer of metallic silver.

However, such glass sheets impose constraints during their use. This is because the layers deposited by sputtering are relatively weak and have to be protected from chemical agents and from bad weather. When they are employed in multiple glazings (that is to say, comprising several glass sheets), care has to be taken that the soft layers forming the stack be incorporated on glass surfaces internal to the glazings, so as to shield them from the damaging action of the external agents.

The invention is targeted at overcoming the disadvantages of the known coated glass sheets by providing in particular sheets which are insensitive to chemical and atmospheric agents and which can withstand a thermal tempering.

To this end, the invention relates to an inorganic glass sheet coated on each of its faces with a coating, the coating of a first face being composed of at least one hard layer and that of the other face of at least one reflecting layer, according to which the reflecting layer is a durable silver-free layer.

The invention relates to an inorganic glass sheet. This is understood to mean a sheet of glass, with a thickness of least 0.5 mm and of at most 10 mm, comprising silicon as one of the essential constituents of the vitreous material. Sheets of organic glass composed of more or less transparent plastics comprising polymers based on carbon chains and/or polymers derived from silanes do not come within the invention.

The glass sheet in accordance with the invention is coated on each of its faces. This coating can be produced over the whole of the surface of the sheet or, on the contrary, may cover only a portion of a face of the latter, directly above or not directly above the coated portion carried by the other face. Preferably, the glass sheet according to the invention is coated over the whole of its two faces.

The coating covering one or other face of the sheet is composed of a film not exceeding 1 µm in thickness. This coating is transparent or at least translucent at the wavelengths of visible light, that is to say that it exhibits a light transmittance of at least 50% and preferably of at least 60%, when it is applied to a clear soda-lime-silica float glass with a thickness of 4 mm, measured with a source in accordance with the CIE Standard "daylight" illuminant D65 and under a solid angle of 2°, according to European standard EN410.

According to the invention, the coating of a first face of the glass sheet is composed of at least one hard layer. Hard layer is understood to denote a scratch-resistant layer which cannot be adversely affected by chemicals present in the environment, in particular those in the atmosphere, in a wide temperature range corresponding to the most extreme conditions and for which the mechanical properties are in addition sufficiently good to withstand, without damage, the heat treatments of bending and tempering. These hard layers are generally employed in the plant of the float process for the formation of the glass sheet, for example by a pyrolytic chemical vapor phase deposition (CVD) process, on a glass ribbon during manufacture. Other deposition techniques are also possible for the hard layer, such as vaporization (spray or PECVD).

The glass sheet in accordance with the invention is covered on the second face with a reflecting layer. Reflecting layer is understood to denote here a layer for which the reflectance of visible light, measured on the layer applied to a clear soda-lime-silica float glass with a thickness of 4 mm, is at least 15%, according to European standard EN410 (solid measuring angle of 2°).

According to the invention, the reflecting layer is a durable silver-free layer. The term "durable" is understood to denote a layer for which the mechanical strength approaches that of the hard layers, such as those covering the first face of the glass sheet and which can be deposited subsequent to the manufacture of this sheet, outside the float plant. These durable layers are deposited by cathode sputtering and are distinguished by the use of a system of layers such that the resistance of these systems is substantially improved in comparison with that of the systems known previously.

Preferably, these durable layers successfully pass the tests of European standard EN1096-2, which describe the mechanical strength and chemical resistance of coated glass of the category defined as "class B" by the standard.

According to a first embodiment of the glass sheet according to the invention, the inorganic glass is a glass belonging to the category of the soda-lime-silica glasses. Such glasses have a main composition lying within the following ranges, expressed as % of the weight of glass:

| | | | |
|---|---|---|---|
| $SiO_2$ | 60-75 | MgO | 0-10 |
| $Na_2O$ | 10-20 | $K_2O$ | 0-10 |
| CaO | 0-16 | BaO | 0-2 |
| $Al_2O_3$ | 0-5 | | |
| with BaO + CaO + MgO 10-20 | | | |
| and $Na_2O + K_2O$ 10-20 | | | |

Preferably, the glass of the sheet according to the invention is a float glass obtained in a process of floating the molten glass over a flat surface of liquid tin, commonly referred to as the float process.

The glass of the sheet is a clear glass or a glass colored in its body by means of a small proportion of at least one metal oxide not exceeding 2% by weight of the total glass and generally not exceeding 0.5% of this weight. Such oxides are, for example, FeO, $Fe_2O_3$, CoO, MnO and $Cr_2O_3$.

According to one embodiment, the hard layer of the coating of the first face is a pyrolytic layer transparent to visible light. The pyrolytic layer is a layer resulting from a deposition carried out at high temperature on the glass, that is to say from 500 to 750° C. for a soda-lime-silica glass.

Preferred pyrolytic layers are low emissivity layers which comprise at least one metal oxide as chosen from oxides of Sn, In, Fe, Si, Ti, Cr, Co and their mixtures. These oxides are sometimes doped by means of a minor proportion of another element, such as F, Sb, C and Al. These layers can be employed directly on the ribbon of molten glass or glass in the course of solidifying in the float process, either inside the chamber in which the glass is floated over the bath of molten tin or after this. Two different processes are used, namely: by spraying solutions of metal salts over the glass ribbon or by chemical vapor deposition (CVD), starting from gaseous precursors. In such a process, the hard layer is always located on the "air" side of the glass sheet, that is to say the side which does not come into contact with the liquid tin surface.

In the implementation of the glass sheet in accordance with the invention, the durable reflecting layer comprises a niobium oxide, a tantalum oxide or a mixture of these oxides, or an oxide of titanium and of at least one element from the following group: Al, Zr, Hf, V, Nb, Ta, Mn, Fe, Co, Ni, Cu, Cr and Si. Preferably, the glass sheet in accordance with the invention carries the reflecting layer on the "tin" side of the float glass sheet.

The preferred glass sheets are coated with a reflecting layer comprising a titanium and zirconium oxide. The mixture of Ti and Zr oxide is deposited by cathode sputtering, preferably from ceramic targets of Zr and Ti oxide.

The surface layer can also include additional components in a very low proportion, generally less than 8% by weight and most often less than 5% by weight. These are in particular doping elements, the role of which is mainly to improve the manufacture and/or the use of the cathodes in the production of the layers in the vacuum deposition techniques. These elements are conventionally intended in particular to improve the conductivity of the materials forming the cathodes, such as: Ti or Al. They may also be compounds which stabilize certain constituents, such as Ca or Mg, or else are elements which appear as inseparable from others during the preparation. This is the case with the lanthanides, such as yttrium oxide or hafnium oxide.

The thickness of the reflecting layers according to the invention generally ranges from 15 to 90 nm and preferably from 30 to 60 nm.

An alternative embodiment of the glass sheet in accordance with the invention is that where the system comprising the reflecting layer also comprises an underlayer based on at least one metal oxide, one metal nitride or one metal oxynitride or their mixtures, interposed between the substrate formed by the glass sheet and the reflecting layer and intended in particular to form a barrier to the migration of the alkali metal ions from the glass substrate or to improve the mechanical properties of the system of layers.

Preferably, this underlayer is itself a layer resulting from the deposition carried out by cathode sputtering. The underlayers which are particularly preferred are underlayers based on $SiO_2$, underlayers based on SiN or on SiON, or also based on titanium oxide or oxynitride with a limited proportion of nitrogen (N/O of less than 10%) or also underlayers based on $SnO_2$. $SnO_2$ underlayers with thicknesses of 10 to 25 nm and preferably of 13 to 17 nm have given excellent results. Underlayers comprising $SnO_2$ as a mixture with a Zn oxide (up to 50% by weight of zinc oxide) have also given good results.

When the additional layers exhibit a relatively low refractive index, such as, for example, for $SiO_2$, their thickness is chosen preferably to be relatively thinner than that of the reflecting layer or layers in order not to detrimentally affect the properties in question. The optical path corresponding to this barrier layer of low index advantageously does not represent more than a third and preferably not more than a quarter of the optical path of the combined layers of the system.

Advantageously, when one or more underlayers are used to contribute to the reflecting properties of the system, they are chosen with a refractive index which is as high as possible and preferably greater than 2.2. Different reflecting layers can be used in addition to the surface layer, in particular layers of titanium oxide, niobium oxide, tantalum oxide, zirconium oxide, optionally in the suboxide form or in the oxynitride form.

In contrast to the hard surface layer, when an underlayer which improves the reflection is based on titanium oxide, it is not necessary to combine this oxide with elements which improve the resistance thereof. As it is under the reflecting layer which is on principle resistant, this underlayer in itself does not have to offer the same qualities. The usefulness of such a $TiO_2$ layer without addition of another oxide lies in the high index which it exhibits, in comparison with that of the mixed oxides of titanium and of at least one other metal. These mixed oxides, although forming a layer having considerable reflection, at an equal thickness, reflect less than the titanium oxide alone. The combination of a primer layer of titanium oxide in contact with the glass and of a layer of mixed oxide of titanium and of another metal combines both the overall advantage of a high refractive index and of a good surface resistance.

The use of a layer of titanium oxide having a high index may not, however, exhibit the best combination of properties, in particular mechanical properties. Relatively thick $TiO_2$ layers are not necessarily the most appropriate. This can also result in limiting the thickness of the underlying layer of $TiO_2$ (or $TiO_x$ or $TiO_xN_y$), then other layers having a relatively high index complementing the system, including in particular another layer of mixed titanium oxide, the other metal of which is of the same nature as or different from that of the metal of the surface layer.

A typical combination comprises, for example, in addition to the highly resistant surface layer, one or more layers having a high refractive index, and a barrier layer. A combination of reflecting layers of this type is, for example, a sequence of layers comprising a surface layer based on a titanium and zirconium mixed oxide composition, in contact with this a layer of titanium oxide advantageously deposited from a ceramic titanium oxide cathode which is optionally doped, resulting in a layer of slightly substoichiometric oxide, and under this layer another layer of mixed oxide of titanium and of another oxide of the type of those which may occur in the hard surface layer.

Systems of layers are formed in particular in the following way starting from glass; the thicknesses given in brackets are expressed in nanometers:
1. $G/SnO_2$ (15)/TZO (50)
2. $G/Si_3N_4$ (17)/TZO (38)
3. $G/SiO_2$ (10)/TZO (50)
4. $G/SnO_2$ (10)/TaO (20)
5. $G/SnO_2$ (10)/TaNbO (20)
6. $G/SnO_2$ (10)/$TiO_x$ (10)/TZO (30)
7. $G/SiO_2$ (40)/$TiO_x$ (10)/TZO (30)

In these systems, TZO is a layer composed of a mixed oxide of titanium and zirconium comprising 45% by weight of zirconium. It additionally comprises yttrium oxide (approximately 6%), which stabilizes the zirconium. The layer optionally also comprises oxides of aluminum, titanium or other elements which, incorporated in the cathodes, improve their conductivity and consequently the stability of the deposition operation. $TiO_x$ denotes the titanium oxide deposited from a ceramic cathode and optionally exhibiting a slight substoichiometry. TaNbO is a mixed oxide of tantalum and niobium.

The invention also relates to a process for the manufacture of an inorganic glass sheet coated on each of its faces. The manufacturing process according to the invention comprises the following stages:
a) depositing a hard layer on the air face of a glass ribbon at high temperature in a plant for the production of glass according to the float process, b) annealing, cooling and cutting up the glass ribbon in order to form sheets coated on a first face with a hard layer,
c) storing the cut sheets coated on one face,
d) conveying the sheets coated on a first face to a coating machine,
e) coating the second face of the glass sheet, or tin face, with at least one durable reflecting layer of the type described above.

In this process, the terms identical to those defined or explained above for the coated glass sheet retain in this case the same meanings.

Preferably, in the process in accordance with the invention, the deposition of the hard layer is carried out by a chemical vapor phase deposition process or CVD process.

It is also preferable, in this process, for the reflecting layer to be deposited on the second face of the glass sheet by cathode sputtering. More preferably still, the reflecting layer is deposited by magnetron-assisted vacuum cathode sputtering.

Finally, the invention relates to the use of the glass sheet in accordance with the invention to produce glazings which insulate from heat or cold.

It relates in particular to the use of this sheet in the preparation of glazings intended for the exterior or interior surfaces of buildings.

A first embodiment is the use of the sheets coated on both faces in accordance with the invention to produce multiple glazings, in particular double glazings or triple glazings. Examples are the double glazings and the triple glazings used to insulate buildings in winter and also in summer in inhabited regions having a cold or temperate climate or also the incorporation of such a glass sheet in multiple glazings fitted to the doors of ovens or refrigerators/freezers.

In the doors of domestic electric ovens, the glass sheets according to the invention are particularly advantageous for doors comprising 2 glass sheets (low temperature ovens) and in doors comprising 3 or 4 glass sheets which equip high temperature ovens (pyrolytic self-clean ovens) but, in the latter case, preferably for the glass sheets other than the one on the interior side of the oven, which is generally made of borosilicate glass in order to withstand the high temperatures without giving rise to devitrification.

The invention will also be described below by examples in the construction industry intended to give a better illustration of it, without, however, wishing to limit the scope thereof.

EXAMPLE a

Single Glazing

A single glazing, formed of a single sheet of clear soda-lime-silica glass of float type, was coated on each of its faces, on the one hand on the air face with a hard layer deposited inside or outside the outlet of the floating chamber for the glass during the manufacture thereof by the chemical vapor phase deposition (CVD) technique and, on the other hand, on the other face (tin face) with a reflecting layer of Ti and Zr oxide deposited by magnetron-assisted vacuum cathode sputtering.

The pyrolyzed layer is composed of tin oxide doped with fluorine. It exhibits a thickness of 400 nm. The deposit by cathode sputtering consists of an $SnO_2$ underlayer with a thickness of 15 nm and a hard surface layer of the mixed titanium and zirconium oxide described above, with a thickness of 43 nm.

This single glazing was subsequently subjected to various evaluations in conformity with the main European standards for measuring the properties of glazings in the construction industry. The results of the measurements are given in the following table 1. In this table and in the following tables, the following abbreviations were used:

Tv (visible): Light transmittance (%) in visible light with a CIE standard illuminant D65 analyzed under a solid angle of observation of 2° according to standard EN410;
Tv (IR): Transmittance in IR light (%) according to standard EN410;
R (visible): Reflectance in visible light (%) according to standard EN410;
R (IR): Reflectance in IR light (%) according to standard EN410;
g: Solar factor according to standard EN410;
U: Coefficient of thermal transmittance $(W/(m^2 \cdot K))$ according to standard EN410;
e: Emissivity according to standard EN12898;
HRC: durable highly reflecting layer of mixed titanium and zirconium oxide as in example a) above;
PC: pyrolytic layer of $SnO_2$ doped with fluorine (hard layer) as in example a) above;
P1: face located on the side facing the source of heat or the source of cold;
P2: second face of the sheet.

TABLE 1

(Single glazing)

| Example No. | Position | Nature | Tv (visible) | Tv (IR) | R (visible) | R (IR) | g | U | e |
|---|---|---|---|---|---|---|---|---|---|
| Ex. 1 | P1 | HRC | 58.3 | 46.9 | 31.5 | 18.6 | 56.1 | 3.58 | 0.11 |
|  | P2 | PC |  |  |  |  |  |  |  |
| Ref. 1 | P1 | HRC | 67.1 | 72.1 | 31.6 | 17.1 | 69.8 | 5.8 | 0.89 |
|  | P2 |  |  |  |  |  |  |  |  |
| Ref. 2 | P1 | PC | 77.1 | 54.3 | 15.3 | 13.1 | 71.2 | 5.8 | 0.11 |
|  | P2 |  |  |  |  |  |  |  |  |

Reference glasses (Ref. 1 and Ref. 2) have also been subjected to the same measurements and the results have been incorporated in table 1.

It may be observed that the glasses comprising a coating of HRC type (Ex. 1 and Ref. 1) give the highest (visible) reflections. Among these glasses, the glass of Ex. 1 in accordance with the invention gave a coefficient of thermal transmittance U among the lowest, comparable to that of the glass of Ref. 3 with a hard layer on the 1st face and a soft silver-comprising coating on the other face. This coefficient of thermal transmittance is moreover substantially better than that of the glass of Ref. 1, which only has an HRC coating on just one of its faces.

With regard to the solar factor g, that of the glass of Ex. 1 is smaller (better) than those of the glasses of Ref. 1 (just 1 HRC) and Ref. 2 (just 1 PC).

Finally, the emissivity of the HRC layer of the glass of Ex. 1 according to the invention is as low (in fact the same) as that of a glass only carrying just one hard PC layer on one of its faces.

EXAMPLE b

Double Glazing

Double glazings (Ex. 2 and 3) were produced in which one of the two glasses was in accordance with the invention, namely an HRC coating deposited on one face and a PC on the other face of the same glass.

In each of the double glazings tested, the positions P1 and P4 are external to the glazing and the positions P2 and P3 are located inside the glazing, sheltered from the external atmosphere.

The same measurements were carried out as in example 1. The results are given in the following table 2.

TABLE 2

(Double glazing)

| Example No. | Position | Nature | Tv (visible) | R (visible) | Tv (IR) | R (IR) | g | U |
|---|---|---|---|---|---|---|---|---|
| Ex. 2 | P1 | HRC | | | | | | |
| | P2 | PC | | | | | | |
| | P3 | | 54.1 | 36.1 | 38.4 | 23.3 | 50.4 | 1.41 |
| | P4 | | | | | | | |
| Ex. 3 | P1 | | | | | | | |
| | P2 | | 54.1 | 34.8 | 38.4 | 19.4 | 61.1 | 1.40 |
| | P3 | PC | | | | | | |
| | P4 | HRC | | | | | | |

When the HRC is on the side of the source of heat or the source of cold (P4), it is seen that the best performance in reflecting IR radiation (that is to say, the lowest reflectance R(IR)) is obtained (Ex. 3). The coefficient of thermal transmittance U is comparable for HRC in P1 or P4 position.

EXAMPLE c

Triple Glazing

Triple glazings were also prepared (Ex. 4 to 7) in which one of the three glasses was in accordance with the invention, namely an HRC deposited on one face and a PC on the other face of the same glass.

The results have been entered in the following table 3.

TABLE 3

(Triple glazing)

| Example No. | Position | Nature | Tv (visible) | R (visible) | Tv (IR) | R (IR) | g | U |
|---|---|---|---|---|---|---|---|---|
| Ex. 4 | P1 | HRC | | | | | | |
| | P2 | PC | | | | | | |
| | P3 | | | | | | | |
| | P4 | | 49.9 | 40.5 | 31.1 | 24.5 | 46.5 | 1.08 |
| | P5 | | | | | | | |
| | P6 | | | | | | | |
| Ex. 5 | P1 | | | | | | | |
| | P2 | | | | | | | |
| | P3 | HRC | | | | | | |
| | P4 | PC | 50.0 | 39.7 | 31.2 | 22.6 | 47.8 | 1.07 |
| | P5 | | | | | | | |
| | P6 | | | | | | | |
| Ex. 6 | P1 | | | | | | | |
| | P2 | | | | | | | |
| | P3 | PC | | | | | | |
| | P4 | HRC | 50.0 | 37.3 | 31.2 | 20.6 | 55.1 | 1.07 |
| | P5 | | | | | | | |
| | P6 | | | | | | | |
| Ex. 7 | P1 | | | | | | | |
| | P2 | | | | | | | |
| | P3 | | | | | | | |
| | P4 | | 49.2 | 36.9 | 31.1 | 20.1 | 55.4 | 1.07 |
| | P5 | PC | | | | | | |
| | P6 | HRC | | | | | | |

Just as for the double glazing, it is found here that the best performance is obtained when the HRC is located on the side of the source of heat or source of cold (Ex. 7). Situations in which the HRC covers a glass interior to the glazing (Ex. 5 and 6) give results intermediate between those of the best example (Ex. 7) and those where the HRC is located on the side of the surroundings external to the source of heat/cold (Ex. 4).

As regards the position of the HRC coating, it is found that the closer it is to the source of heat or cold (P6), the lower is the IR reflection: the glazing of Ex. 7 is the best in terms of IR reflectance.

The invention claimed is:
1. A coated inorganic glass sheet comprising:
   an inorganic glass sheet;
   a first coating on a first face of the inorganic glass sheet, said first coating comprising at least one pyrolytic layer transparent to visible light; and
   a second coating on a second face of the inorganic glass sheet, said second coating consisting of in the following sequence starting from the second face of the glass sheet:
   i) an optional underlayer,
   ii) an optional additional reflecting layer, and
   iii) a first reflecting layer,
   wherein the reflecting layer reflects at least 15% visible light as measured when the first reflecting layer is applied to a clear soda-lime float glass sheet with a thickness of 4 mm according to EN410 (according to EN410 —solid angle of 2°),
   wherein the reflecting layer is a durable layer deposited by cathode sputtering.
2. The coated inorganic glass sheet of claim 1, wherein the inorganic glass of the glass sheet is a soda-lime-silica glass which is clear or colored.
3. The coated inorganic glass sheet of claim 1, wherein the pyrolitic layer comprises tin oxide doped with fluorine or antimony.
4. The coated inorganic glass sheet of claim 1, wherein the first reflecting layer comprises:
   a niobium oxide, a tantalum oxide, or a mixture thereof; or
   an oxide of titanium and at least one oxide of an element selected from the group consisting of Al, Zr, Hf, V, Nb, Ta, Mn, Fe, Co, Ni, Cr, Cu and Si.
5. The coated inorganic glass sheet of claim 4, wherein the first reflecting layer comprises a mixture of titanium oxide and zirconium oxide.

6. The coated inorganic glass sheet of claim 1, wherein the second coating comprises the underlayer, the underlayer comprising a metal oxide, a metal nitride or a metal oxynitride.

7. The coated inorganic glass sheet of claim 6, wherein the underlayer comprises pure tin oxide or a mixture of tin oxide and zinc oxide, such that a content of zinc oxide is up to 50% by weight.

8. The coated inorganic glass sheet of claim 7, wherein the underlayer comprises silicon oxide, nitride or oxynitride.

9. The inorganic glass sheet of claim 1, further comprising the additional reflecting layer, the additional reflecting layer comprising an oxide of tantalum, an oxide of niobium, an oxide of titanium, or a titanium oxynitride with an N/O ratio of less than 10%.

10. A glazing, comprising the coated inorganic glass sheet of claim 1, wherein the glazing is suitable for insulating from heat or cold.

11. The glazing of claim 10, which is suitable for the exterior or interior surfaces of buildings.

12. The coated inorganic glass sheet of claim 1, which is suitable as a glass sheet exterior or interior to a glazing of a door to a domestic electric oven.

13. The coated inorganic glass sheet of claim 1, further comprising the additional reflecting layer, the additional reflecting layer comprising a suboxide of tantalum, a suboxide of niobium, or a suboxide of titanium.

14. The coated inorganic glass sheet of claim 1, wherein the thickness of the reflecting layers is from 15 to 90 nm.

15. The coated inorganic glass sheet of claim 1, wherein the thickness of the reflecting layers is from 30 to 60 nm.

16. The coated inorganic glass sheet of claim 1, wherein the first coating consists of a pyrolytic layer transparent to visible light.

17. A coated inorganic glass sheet, consisting essentially of:
   an inorganic glass sheet;
   a pyrolytic layer transparent to visible light on a first face of the inorganic glass sheet; and
   a second coating on a second face of the inorganic glass sheet, each layer in the second coating deposited by cathode sputtering, and said second coating consisting of in the following sequence starting from the second face of the glass sheet:
   i) an optional underlayer,
   ii) an optional additional reflecting layer, and
   iii) a first reflecting layer,
   wherein the first reflecting layer reflects at least 15% visible light as measured when the first reflecting layer is applied to a clear soda-lime float glass sheet with a thickness of 4mm according to EN410 (according to EN410 —solid angle of 2°),and
   wherein the first reflecting layer comprises:
      a niobium oxide, a tantalum oxide, or a mixture thereof; or
      an oxide of titanium and at least one oxide of an element selected from the group consisting of Al, Zr, Hf, V, Nb, Ta, Mn, Fe, Co, Ni, Cr, Cu and Si, and
      wherein the second coating does not comprise a silver containing layer.

18. The coated inorganic glass sheet of claim 17, wherein the first reflecting layer comprises a mixture of titanium oxide and zirconium oxide.

19. The coated inorganic glass sheet of claim 17, wherein the second coating further comprises the underlayer, the underlayer comprising a material selected from the group consisting of pure tin oxide, a mixture of tin oxide and zinc oxide such that a content of zinc oxide is up to 50% by weight, silicon oxide, silicon nitride, and silicon oxynitride.

20. The inorganic glass sheet of claim 17, further comprising the additional reflecting layer, the additional reflecting layer comprising an oxide of tantalum, an oxide of niobium, an oxide of titanium, or a titanium oxynitride with an N/O ratio of less than 10%.

21. A coated inorganic glass sheet, comprising:
   an inorganic glass sheet;
   a pyrolytic layer transparent to visible light on a first face of the inorganic glass sheet; and
   a second coating on a second face of the inorganic glass sheet, each layer in the second coating deposited by cathode sputtering, and said second coating comprising a first reflecting layer,
   wherein the first reflecting layer reflects at least 15% visible light as measured when the first reflecting layer is applied to a clear soda-lime float glass sheet with a thickness of 4mm according to EN410(according to EN410 —solid angle of 2°),
   wherein the second coating does not comprise a silver containing layer, and
   wherein the first reflecting layer satisfies Class B mechanical strength and chemical resistance requirements of EN1096-2.

* * * * *